July 14, 1970 S. PETERSON 3,520,564
CLAMP FOR PIPES AND THE LIKE
Filed Jan. 6, 1969 2 Sheets-Sheet 2
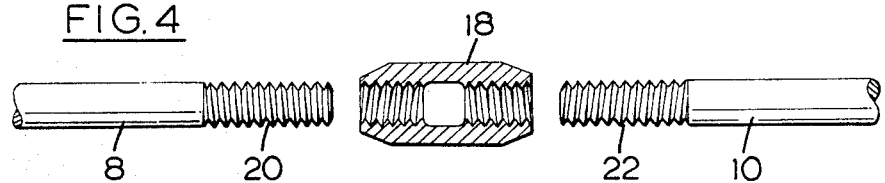
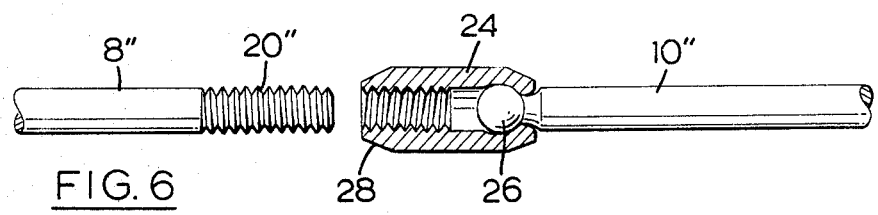
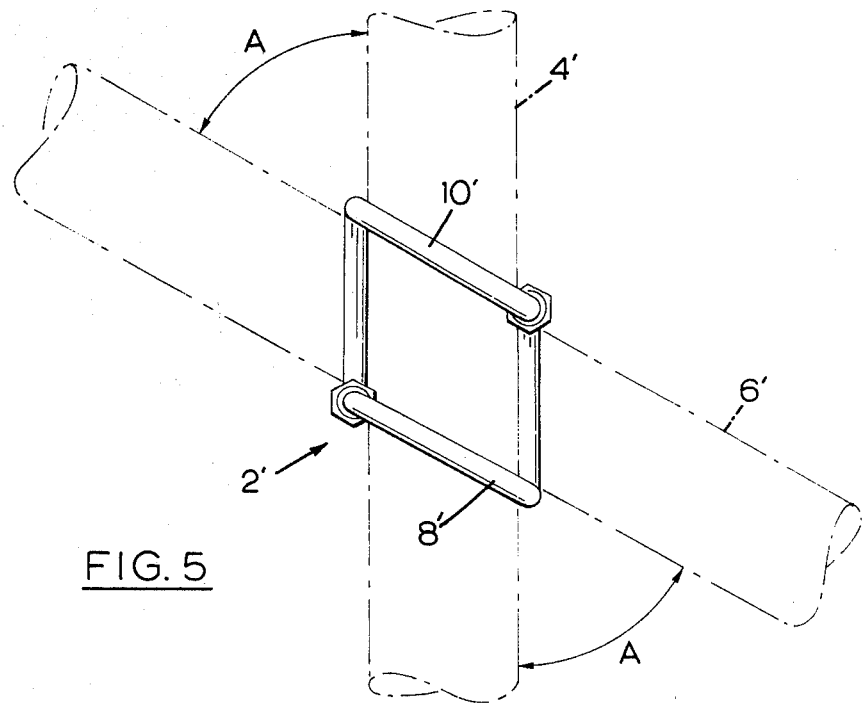
INVENTOR
SVEND PETERSON
BY Rogers, Bereskin, & Parr

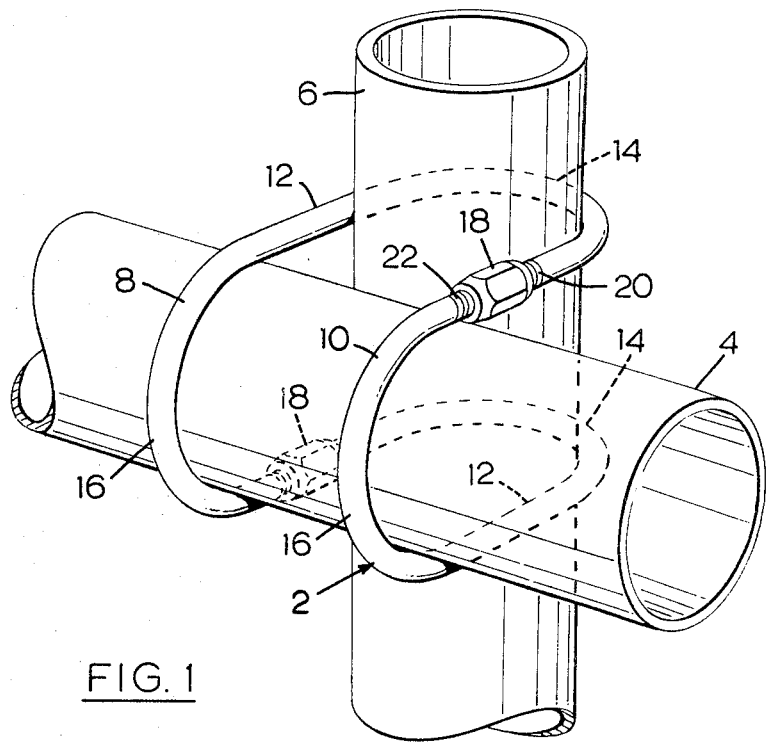
FIG. 1
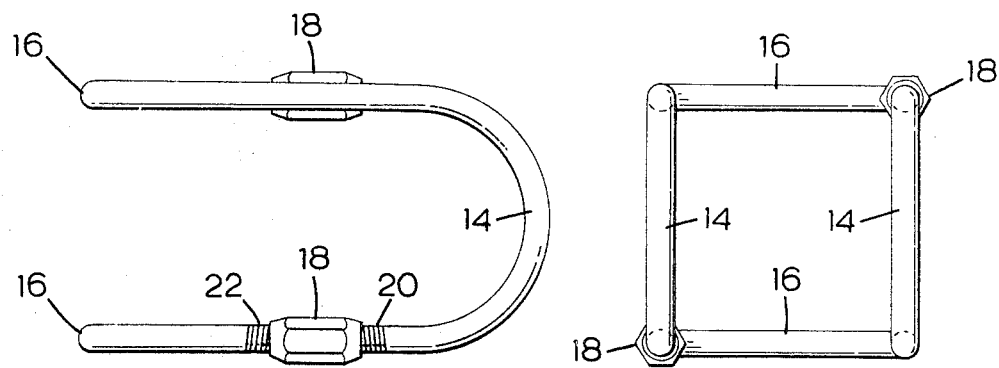
FIG. 2
FIG. 3
INVENTOR.
SVEND PETERSON
BY *Rogers, Bereskin, & Parr*

United States Patent Office 3,520,564
Patented July 14, 1970

3,520,564
CLAMP FOR PIPES AND THE LIKE
Svend Peterson, 425 Deloraine Ave.,
Toronto 12, Ontario, Canada
Filed Jan. 6, 1969, Ser. No. 789,322
Int. Cl. F16b 7/04
U.S. Cl. 287—49                    3 Claims

ABSTRACT OF THE DISCLOSURE

A clamp for clamping together two pipes which cross at 90 degrees. The clamp has two identical clamping members, each member having a straight centre portion and a hooked bite portion at each end of the centre portion. The bite portion at one end of each member lies in a plane at 90 degrees to the plane of the bite portion at the other end of such member. The tips of the bite portions are threaded, and opposing such tips are drawn together by turnbuckles to clamp the pipes.

---

This invention relates to clamps for clamping pipes and the like together where they meet in cross-over relationship. The main application of such clamps is in frame structures built from pipes.

In the past, several types of clamps have been used to form joints between pipes in pipe frame structures. A typical widely used clamp contains sockets into which the ends of the pipes are inserted, and includes grub screws which are screwed against the pipes once they are in the sockets. Such sockets are expensive to manufacture. In addition, pipes used with them must often be cut to fairly precise length tolerances, and the ends of the pipes must be well finished to enter the sockets. Further, a number of different types of sockets must be stocked, increasing expense. Disassembly is also sometimes difficult, because of binding of the pipes in the sockets.

Another clamp commonly used in the art consists of a plate shaped to the contour of the pipe and held in place by two U-bolts which pass around the second pipe and through the plate to hold the pipes in overlapping relationship. This assembly requires three different types of parts (U-bolts, plates, nuts) and also suffers from the problem that there is a bending moment on the plate which distorts it and locks it onto the U-bolts. This makes disassembly difficult sometimes requiring special tools to separate the parts.

This device is an improvement over the prior art devices in that it consists of a pair of clamping members similar to each other in nature which form a clamp to hold the pipes in overlapped fixed relation. Each member comprises a straight portion with a bight portion at each end. One bight portion lies in a plane which is at an angle to the plane containing the second bight portion such that the angle between the planes is the same as the angle between the pipes to be clamped. When two of these members are arranged about the overlapped pipes, the corresponding ends of the bight portions are held together by a pair of fastening members and the clamping force is applied through these fastening members. This device is simple to make, economical of materials, and allows a great variety of structures to be made from a small inventory of clamping parts. These and other advantages will be evident from the following description and drawings wherein:

FIG. 1 is a schematic view of an assembly of two pipe sections held together by a clamp according to the present invention;

FIG. 2 is a side view of the assembled clamp of FIG. 1;

FIG. 3 is an end view of the assembled clamp looking along lines 3—3 of FIG. 2;

FIG. 4 is an exploded view of turnbuckle fastening means for the FIG. 1 clamp, showing the turnbuckle in cross-section;

FIG. 5 is a view similar to FIG. 3 showing an embodiment of the clamp which is adapted to hold two pipes at an acute angle to one another; and FIG. 6 is an exploded view of a captive nut fastening means for the FIG. 1 clamp, showing the captive nut in cross-section.

Reference is first made to FIG. 1, in which a clamp 2 according to the present invention is shown in position holding two pipes 4, 6 together.

The clamp 2 includes two identical clamping members 8, 10, each of small diameter rod stock. Each clamping member has a straight central portion 12 and a pair of end bight portions 14, 16. Each bight portion extends from an end of the straight central portion, curves around 180 degrees, and extends back parallel to the central portion. The bight portions 14, 16 at each end of each clamping member are arranged in planes at 90 degrees to each other, as also shown in FIGS. 2 and 3.

The clamping members 8, 10 are held together by turnbuckles indicated at 18. The turnbuckles 18 cooperate with threaded ends 20, 22 of bight portions 14, 16, the threaded ends being of opposite hand so that rotation of the turnbuckle will move the members 8, 10 closer together or farther apart depending upon the direction of rotation. The ends of the turnbuckles are tapered at an angle of about 30 degrees to the axis of the turnbuckles, to minimize interference between the turnbuckles and the pipes while permitting maximum length for the turnbuckles.

The clamp 2 just described can be assembled about the pipes 4, 6 in two different ways. In the first procedure, the pipes 4, 6 are brought into the desired position; the clamping members 8, 10 are placed in position on the pipes, the turnbuckles 18 are then screwed onto opposed tips of the bight portions 14, 16 and are tightened. In the second procedure, the clamp 2 is assembled loosely (i.e. the turnbuckles 18 are screwed part way into the opposed ends of the bight portions 14, 16). The assembled clamp 2 is then slid onto one of the pipes 2, 4, and the other pipe is then slid into the clamp to the desired position, after which the clamp is tightened.

The clamp is suitable for making shelving, racks, worktable frames, monkey bars for children, boat docks, sign frames, etc. from a minimum of fittings and using standard pipe stock.

The clamp and pipes can be disassembled by loosening the turnbuckles and sliding the pipes out of the clamp. If the structure is such that sliding is not possible, the turnbuckles can be released from the clamping members leaving the parts of the clamp free to be removed from the pipes. There is no force necessary to break the joint other than that to turn the turnbuckles. The pipes are then free and are not bound in any way to the parts of the clamp.

This device is simple to make since it consists mainly of bent metallic rod stock. It can be made from two identical clamping members so that the variety of stocked parts is reduced compared with prior art devices.

FIG. 5 shows an embodiment in which the pipes meet at an acute angle A. In this embodiment (in which primed reference numerals indicate corresponding parts), the clamping members 8' and 10' are also similar in shape and size. The planes containing the bight portions 14' and 16' would intersect at an angle equal to the angle A as shown in FIG. 6. However it will be apparent that by constructing a clamp with the fastening means inside the acute angles A, the planes containing the bights will meet at an angle which is the supplement of A. The embodiment shown in FIG. 5 has the advantage that it will allow better access to the fastening means than would an embodiment in which the fastening means is inside the acute angle A.

It will be noted that the FIG. 5 clamp should normally be used only where the forces acting on the pipes to tend to rotate them to an angle intersection of 90 degrees are very low. If such forces are high, this will tend to twist the clamp and loosen its grip on the pipes. In such event, the pipes will usually be arranged such that the clamp configuration shown in FIG. 1 can be used at each intersection of two pipes.

FIG. 6 shows an embodiment of the fastening means which uses a captive nut 24. In this embodiment (in which double primed reference numerals indicate corresponding parts) the nut 24 is free to rotate on the end of the member 10" but is not free to come off that member, being held by a ball and socket joint 26. The threaded end 20 of the member 8 is adapted to be received by the threaded end of the nut 24. This fastening member will preferably have a chamfer 28 to give the fastening member maximum thread length without interfering with the pipes when assembled.

The clamps of this invention may be made from plastic material for light work such as holding flexible pneumatic piping or electrical cable in fixed relation to avoid rubbing caused by machine vibrations. They may also be made from a number of materials with different cross-sections without departing from the spirit of the invention.

What I claim as my invention is:

1. A clamp for securing together two pipes or the like at a predetermined angle, said clamp comprising:
   a pair of clamping members formed from rod material;
   each said member having a straight portion, a first end of said straight portion extending into a first bight portion lying in a first plane, and a second end of said straight portion extending into a second bight portion lying in a second plane;
   said first plane lying at an angle to said second plane equal to said predetermined angle, each said bight portion having a threaded tip remote from said straight portion;
   each threaded tip of one clamping member facing a corresponding threaded tip of the other clamping member when said clamping members are in clamping position on said pipes,
   and a pair of turnbuckles cooperating with said threaded tips for releasably connecting said corresponding threaded tips and for drawing said corresponding threaded tips together.

2. A clamp for securing together two pipes or the like at a predetermined angle, said clamp comprising:
   a pair of clamping members formed from rod material;
   each said member having a straight portion, a first end of said straight portion extending into a first bight portion lying in a first plane, and a second end of said straight portion extending into a second bight portion lying in a second plane;
   said first plane lying at an angle to said second plane equal to said predetermined angle, each said bight portion having a tip remote from said straight portion;
   each tip of one clamping member facing a corresponding tip of the other clamping member when said clamping members are in clamping position on said pipes,
   and a pair of fastening members co-operating with said tips for releasably connecting said corresponding tips and for drawing said corresponding tips together, said fastening members being a pair of captive nuts each free to rotate on one of said tips, and wherein the others of said tips are threaded to receive said nuts.

3. A clamp for securing together two pipes or the like at a predetermined angle, said clamp comprising:
   a pair of clamping members formed from rod material;
   each said member having a straight portion, a first end of said straight portion extending into a first bight portion lying in a first plane, and a second end of said straight portion extending into a second bight portion lying in a second plane;
   said first plane lying at an angle to said second plane equal to said predetermined angle, each said bight portions having a tip remote from said straight portions;
   each tip of one clamping member facing a corresponding tip of the other clamping member when said clamping members are in clamping position on said pipes,
   and a pair of fastening members co-operating with said tips for releasably connecting said corresponding tips and for drawing said corresponding tips together, the axial extent of said fastening members being less than the extent of said straight portion not in contact with said pipes and the ends of said fastening members being tapered to minimize their interference with the pipes.

References Cited

UNITED STATES PATENTS

| | | | |
|---|---|---|---|
| 39,239 | 7/1863 | Packer | 287—61 XR |
| 1,118,213 | 11/1914 | Moore | 287—61 |

FOREIGN PATENTS

| | | |
|---|---|---|
| 417,366 | 11/1947 | Italy. |
| 985,871 | 3/1951 | France. |
| 659,841 | 10/1951 | Great Britain. |

DAVID J. WILLIAMOWSKY, Primary Examiner

A. KUNDRAT, Assistant Examiner